US012674084B2

(12) United States Patent
Kato

(10) Patent No.: US 12,674,084 B2
(45) Date of Patent: Jul. 7, 2026

(54) RESIN COMPOSITION AND CURED PRODUCT THEREOF

(71) Applicant: Henkel AG & Co. KGaA, Duesseldorf (DE)

(72) Inventor: Taiki Kato, Kanagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 651 days.

(21) Appl. No.: 18/115,475

(22) Filed: Feb. 28, 2023

(65) Prior Publication Data

US 2023/0212443 A1 Jul. 6, 2023

Related U.S. Application Data

(63) Continuation of application No. PCT/EP2021/072940, filed on Aug. 18, 2021.

(30) Foreign Application Priority Data

Aug. 31, 2020 (EP) .................................... 20193556

(51) Int. Cl.

| | |
|---|---|
| ***C08F 2/46*** | (2006.01) |
| ***C08F 2/50*** | (2006.01) |
| ***C08G 61/04*** | (2006.01) |
| ***C09J 133/14*** | (2006.01) |

(52) U.S. Cl.

CPC .................................. *C09J 133/14* (2013.01)

(58) Field of Classification Search

CPC .......... C09J 133/14; C08L 9/00; C08K 5/092; C08K 5/37; C08K 5/378; C08K 5/13; C08K 5/17

USPC ................................. 522/102, 100, 1; 520/1

See application file for complete search history.

(56) References Cited

U.S. PATENT DOCUMENTS

| | | | | |
|---|---|---|---|---|
| 10,472,461 | B2 | 11/2019 | Arai | |
| 10,995,245 | B2 | 5/2021 | Ota et al. | |
| 11,111,421 | B2 | 9/2021 | Natori | |
| 2007/0160370 | A1 | 7/2007 | Kikuchi et al. | |
| 2010/0063184 | A1* | 3/2010 | Dershem | C09J 135/06 525/185 |
| 2018/0044478 | A1 | 2/2018 | Iwaya et al. | |
| 2018/0051127 | A1 | 2/2018 | Arai et al. | |
| 2020/0347227 | A1 | 11/2020 | Abe et al. | |
| 2020/0385513 | A1 | 12/2020 | Zillessen et al. | |
| 2022/0057714 | A1 | 2/2022 | Nishiguchi | |

FOREIGN PATENT DOCUMENTS

| | | | | |
|---|---|---|---|---|
| JP | 2007184801 | A | 7/2007 | |
| JP | 2009141406 | A | 6/2009 | |
| JP | 2012153794 | A * | 8/2012 | |
| JP | 2019143038 | A | 8/2019 | |
| JP | 2019214711 | A | 12/2019 | |
| TW | 201704430 | A | 2/2017 | |
| TW | 201811839 | A | 4/2018 | |
| WO | 2013005471 | A1 | 1/2013 | |
| WO | 2018030184 | A1 | 2/2018 | |
| WO | WO-2018047849 | A1 * | 3/2018 | C09K 3/10 |
| WO | 2018181421 | A1 | 10/2018 | |
| WO | 2019115203 | A1 | 6/2019 | |
| WO | 2019151256 | A1 | 8/2019 | |
| WO | 2020121967 | A1 | 6/2020 | |

OTHER PUBLICATIONS

Hirata et al, JP 2012153794 Machine Translation, Aug. 16, 2012 (Year: 2012).*

Iwaya et al, WO 2018047849 Machine Translation, Mar. 15, 2018 (Year: 2018).*

PCT International Search Report issued in connection with International Patent Application No. PCT/EP2021/072940—Mailing date: Dec. 1, 2021.

* cited by examiner

*Primary Examiner* — Jessica Whiteley

(74) *Attorney, Agent, or Firm* — Steven C. Bauman

(57) ABSTRACT

An object of the present invention is to provide an adhesive having sufficient adhesion strength during heat-curing when a lens holder and a substrate on which an imaging element is fixed are bonded in camera module assembly, and also having excellent adhesion strength and position accuracy after a high-temperature and high-humidity durability test after curing. The present invention relates to a resin composition comprises (a) a (meth)acrylate group-containing resin, (b) a specific polyfunctional thiol, and (c) a latent curing agent.

8 Claims, 1 Drawing Sheet

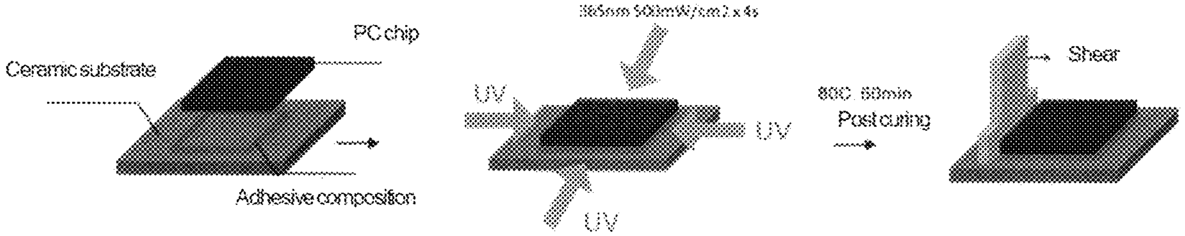
PC chip
Ceramic substrate
Adhesive composition
365nm 500mW/cm2 x 4s
UV
UV
UV
80C 60min
Post curing
Shear

RESIN COMPOSITION AND CURED PRODUCT THEREOF

TECHNICAL FIELD

The present invention relates to a resin composition and cured product thereof.

BACKGROUND ART

A small camera module mounted on a smartphone etc. has a lens, a cylindrical lens holder that holds the lens, and an imaging element that converts the light collected by the lens into electrical signals and that is fixed on a substrate. During the assembly of this small camera module, it is necessary to firmly bond the lens holder and the substrate on which the imaging element is fixed. An adhesive is used to bond them (PTL 1).

When bonding the lens holder and the substrate on which the imaging element is fixed, it is necessary to accurately maintain the distance between the lens and the imaging element. Specifically, it is necessary to match the distance between the lens and the light-receiving surface of the imaging element with the focal length of the lens. The use of a UV-curing adhesive for this purpose has been proposed (PTL 2).

CITATION LIST

Patent Literature

PTL 1: JP2007-184801A
PTL 2: JP2009-141406A

SUMMARY OF INVENTION

Technical Problem

Materials such as LCP are widely used as materials for lens holders. Further, it has recently been understood that lens holders have a larger structure and are heavier than conventional ones because imaging elements for capturing clear images have become large. The present inventor found that as the weight of lens holders increased, the use of conventional UV-curing adhesives caused problems in terms of the initial adhesion strength, as well as the adhesion strength and position accuracy after a high-temperature and high-humidity durability test.

An object of the present invention is to provide an adhesive having sufficient adhesion strength during heat-curing when a lens holder and a substrate on which an imaging element is fixed are bonded in camera module assembly, and also having excellent adhesion strength and position accuracy after a high-temperature and high-humidity durability test after curing.

Solution to Problem

The present inventor conducted extensive studies to solve the above problems, and found that the above problems can be solved by using a resin composition comprising (a) a (meth)acrylate group-containing resin, (b) a polyfunctional thiol having a specific structure, and (c) a latent curing agent. The present invention has been completed upon further studies based on the above finding, and includes the following aspects.

Item 1. A resin composition, comprising:

(a) a (meth)acrylate group-containing resin, (b) at least one polyfunctional thiol selected from the group consisting of compounds represented by the following formulas (1) and (2):

(1)

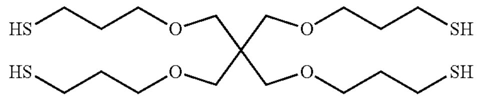

(2)

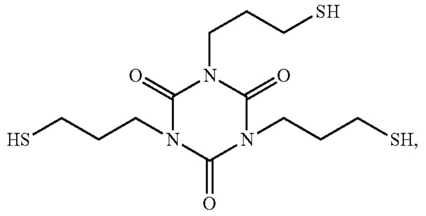

and (c) a latent curing agent.

Item 2. The resin composition according to Item 1, further comprising:

(d) at least one polymerization inhibitor selected from the group consisting of N-nitrosophenylhydroxylamine aluminum, triphenyl phosphite, p-methoxyphenol, and hindered phenol.

Item 3. The resin composition according to Item 1 or 2, further comprising: (e) an anionic polymerization inhibitor that is an organic acid.

Item 4. The resin composition according to any one of Items 1 to 3, further comprising: (f) a photopolymerization initiator.

Item 5. The resin composition according to any one of Items 1 to 4, further comprising: (g) epoxidized polybutadiene.

Item 6. The resin composition according to any one of Items 1 to 5, for use in assembling a camera module.

Item 7. A cured product obtainable by curing the resin composition according to any one of Items 1 to 6.

Item. 8 Use of a resin composition for assembling a camera module, the resin composition comprising:

(a) a (meth)acrylate group-containing resin, (b) at least one polyfunctional thiol selected from the group consisting of compounds represented by the following formulas (1) and (2):

(1)

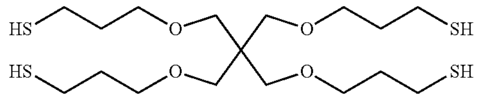

(2)

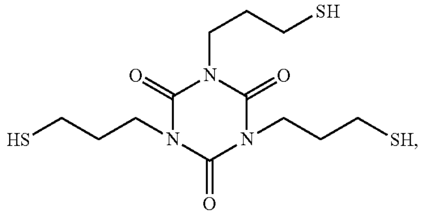

and (c) a latent curing agent.

Item 9. A method for bonding a camera module lens holder and a camera module substrate on which an imaging element is fixed, the method comprising bonding the lens holder and the substrate using a resin composition;

i. the resin composition comprising:

a (meth)acrylate group-containing resin, at least one polyfunctional thiol selected from the group consisting of compounds represented by the following formulas (1) and (2):

(1)

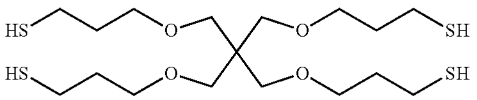

(2)

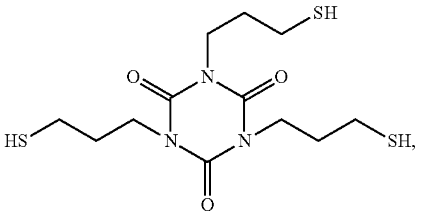

and (c) a latent curing agent.

Advantageous Effects of Invention

When the resin composition of the present invention is used in camera module assembly to bond a lens holder and a substrate on which an imaging element is fixed, sufficient adhesion strength is ensured during heat-curing of the adhesive, and the position accuracy after a high-temperature and high-humidity durability test after curing can be improved.

BRIEF DESCRIPTION OF DRAWING

FIG. 1 is a schematic diagram of an adhesion test in the Examples.

DESCRIPTION OF EMBODIMENTS

In the present specification, the weight average molecular weight (Mw) refers to a polystyrene conversion value determined by gel permeation chromatography (GPC) using a solvent, such as tetrahydrofuran, as an eluent.

In the present specification, the (meth)acrylate, (meth) acrylic, and (meth)acryloyl group mean acrylate or methacrylate, acrylic or methacrylic, and an acryloyl or methacryloyl group, respectively.

(a) (Meth)acrylate Group-Containing Resin

The (meth)acrylate group-containing resin includes, for example, (meth)acrylate, a (meth)acrylate oligomer, an acrylic polymer obtained by copolymerizing a (meth)acrylate monomer with another monomer, and one that can be obtained by reacting (meth)acrylic acid with a resin.

Examples of (meth)acrylates include (meth)acrylic acid esters. The (meth)acrylic acid ester may be a monofunctional (meth)acrylic acid ester or a polyfunctional (meth) acrylic acid ester.

Specific examples of monofunctional (meth)acrylic acid esters include methyl methacrylate, ethyl methacrylate, n-propyl methacrylate, glycidyl methacrylate, 2-hydroxyethyl methacrylate, 2-isocyanatoethyl methacrylate, isobornyl methacrylate (e.g., product name: "IBXA," Osaka Organic Chemical Industry Ltd.), 2-methacryloxyethyltrimethoxysilane, 2-methacryloxyethyltriethoxysilane, 3-methacryloxypropyltrimethoxysilane, 3-methacryloxypropylmethyldimethoxysilane, 3-methacryloxypropyltriethoxysilane, 3-methacryloxymethyldiethoxysilane, 4-methacryloxybutyltrimethoxysilane, 4-methacryloxybutyltriethoxysilane, dicyclopentenyloxyethyl methacrylate (e.g., product name: "FA-512M," produced by Hitachi Chemical Co., Ltd.), dicyclopentanyl methacrylate (e.g., product name: "FA-513M," produced by Hitachi Chemical Co., Ltd.), pentamethylpiperidyl methacrylate (e.g., product name: "FA-711MM," produced by Hitachi Chemical Co., Ltd.), tetramethylpiperidyl methacrylate (e.g., product name: "FA-712HM," produced by Hitachi Chemical Co., Ltd.), methoxy polyethylene glycol methacrylate (e.g., produced by Hitachi Chemical Co., Ltd.), benzyl methacrylate (e.g., product name: "FA-BZM," produced by Hitachi Chemical Co., Ltd.), 2-hydroxy-3-acryloyloxypropyl methacrylate (e.g., product name "Light Ester G-201 P," produced by Kyoeisha Chemical Co., Ltd.), 2-methacryloyloxyethyl phthalic acid (e.g., product name: "CB-1," produced by Shin-Nakamura Chemical Co., Ltd.), methoxy polyethylene glycol methacrylate, phenoxyethylene glycol methacrylate (e.g., product name: "PHE-1G," produced by Shin-Nakamura Chemical Co., Ltd.), stearyl methacrylate (e.g., product name: "S," produced by Shin-Nakamura Chemical Co., Ltd.), 2-methacryloyloxyethyl succinate (e.g., product name: "SA," produced by Shin-Nakamura Chemical Co., Ltd.), 3,4-epoxycyclohexylmethyl methacrylate (e.g., product name: "Cyclomer M100," produced by Daicel Corporation), and the like.

Specific examples of bifunctional (meth)acrylic acid esters include tricyclodecane dimethanol diacrylate (e.g., product name: "SR833," Sartomer), dipropylene glycol diacrylate (e.g., product name: "APG-100," Shin-Nakamura Chemical Co., Ltd.), tricyclodecane dimethanol diacrylate (e.g., product name: "A-DCP," Shin-Nakamura Chemical Co., Ltd.), 1,4-butanediol dimethacrylate (e.g., product name: "FA-124M," produced by Hitachi Chemical Co., Ltd.), neopentyl glycol dimethacrylate (e.g., product name: "FA-125M," produced by Hitachi Chemical Co., Ltd.), polyethylene glycol #200 dimethacrylate (e.g., product name: "FA-220M," produced by Hitachi Chemical Co., Ltd.), bisphenol A type epoxy acrylate (e.g., product name: "Ebecryl 3700," Daicel-Allnex Ltd.), EO-modified bisphenol A dimethacrylate (e.g., product name: "FA-321M," produced by Hitachi Chemical Co., Ltd.), EO-modified polypropylene glycol #700 dimethacrylate (e.g., product name: "FA-023M," produced by Hitachi Chemical Co., Ltd.), ethylene glycol dimethacrylate (e.g., product name: "1G," produced by Shin-Nakamura Chemical Co., Ltd.), diethylene glycol dimethacrylate (e.g., product name: "2G," produced by Shin-Nakamura Chemical Co., Ltd.), triethylene glycol dimethacrylate (e.g., product name: "3G," produced by Shin-Nakamura Chemical Co., Ltd.), polyethylene glycol dimethacrylate (e.g., produced by Shin-Nakamura Chemical Co., Ltd.), 2,2-bis[4-(methacryloxyethoxy)phenyl]propane (e.g., product name: "BPE-80N," produced by Shin-Nakamura Chemical Co., Ltd.), ethoxylated bisphenol A dimethacrylate (e.g., produced by Shin-Nakamura Chemical Co., Ltd.), tricyclodecane dimethanol dimethacrylate (e.g., product name: "DCP," produced by Shin-Nakamura Chemical Co., Ltd.), 1,10-decanediol dimethacrylate (e.g., product name: "DOD-N," produced by Shin-Nakamura Chemical Co., Ltd.), 1,6-hexanediol dimethacrylate (e.g., product name: "HD-N," produced by Shin-Nakamura Chemical Co., Ltd.), 1,9-nonanediol dimethacrylate (e.g., product name: "NOD-N," produced by Shin-Nakamura Chemical Co., Ltd.), neopentyl glycol dimethacrylate (e.g., product name: "NPG," produced by Shin-Nakamura Chemical Co., Ltd.), ethoxylated polypropylene glycol dimethacrylate (e.g., produced by Shin-Nakamura Chemical Co., Ltd.), glycerin dimethacrylate (e.g., product name: "701," produced by Shin-Nakamura Chemical Co., Ltd.), polypropylene glycol dimethacrylate (e.g., produced by Shin-Nakamura Chemical Co., Ltd.), and the like.

Specific examples of trifunctional or higher polyfunctional (meth)acrylic acid esters include trimethylolpropane trimethacrylate (e.g., product name: "TMPT," produced by Shin-Nakamura Chemical Co., Ltd.), tris(2-hydroxyethyl) isocyanurate triacrylate (e.g., product name: "SR368NS," Sartomer), and the like.

The resin composition of the present invention may contain only one, or two or more of the (meth)acrylates.

The (meth)acrylate group-containing resin may be an acrylate oligomer. The resin composition of the present invention has excellent adhesion strength and moisture resistance after curing, because it contains an acrylate oligomer.

Specific examples of the (meth)acrylate group-containing resin include urethane acrylate oligomers. Urethane acrylate oligomers are widely known to those skilled in the art, and can be obtained, for example, by reacting diisocyanates, preferably aliphatic diisocyanates, with hydroxy acrylates. Alternatively, they can be obtained, for example, by reacting diisocyanates, preferably aliphatic diisocyanates, with hydroxy acrylates and polyols.

Examples of urethane acrylate oligomers include polycarbonate-based urethane acrylate oligomers. The resin composition of the present invention particularly has excellent adhesion strength and moisture resistance after curing, because it contains a polycarbonate-based urethane acrylate oligomer. The reason for this is considered to be because the polycarbonate skeleton strongly interacts with the surface to be bonded, such as LCP, and because it is a polymer and thus can prevent the entrance of water under high temperature and high humidity. Polycarbonate-based urethane acrylate oligomers are widely known to those skilled in the art, and can be obtained, for example, by reacting diisocyanates, preferably aliphatic diisocyanates, with hydroxy acrylates and polycarbonates.

Specific examples of polycarbonate-based urethane acrylate oligomers include "UN9200A" (Negami Chemical Industrial Co., Ltd.; weight average molecular weight: 15,000), "UV3310B" (Mitsubishi Chemical Corporation; weight average molecular weight: 5,000), and the like.

Examples of urethane acrylate oligomers include polyether-based urethane acrylate oligomers. Polyether-based urethane acrylate oligomers are widely known to those skilled in the art, and can be obtained, for example, by reacting diisocyanates, preferably aliphatic diisocyanates, with hydroxy acrylates and polyethers. Specific examples of polyether-based urethane acrylate oligomers include "UV6640B" (Mitsubishi Chemical Corporation; weight average molecular weight: 5,000), "UN6202" (Negami Chemical Industrial Co., Ltd.; weight average molecular weight: 11,000), and the like.

The (meth)acrylate group-containing resin preferably includes (meth)acrylate and/or a (meth)acrylate oligomer, an acrylic polymer obtained by copolymerizing a (meth)acrylate monomer with another non-ester monomer, and one that can be obtained by reacting (meth)acrylic acid with a non-polyester resin. Because of their lack of polyester structure, these acrylate resins are more stable under high-temperature and high-humidity conditions after curing.

The weight average molecular weight of the (meth) acrylate oligomer is preferably 4,000 or more.

The weight average molecular weight of the (meth) acrylate oligomer is preferably 5,000 or more, more preferably 6,000 or more, even more preferably 8,000 or more, and still even more preferably 10,000 or more, in terms of forming a sufficiently soft segment structure in a cured product to thereby enhance durability to heat and mechanical stimuli, and to optimize the storage modulus. The weight average molecular weight of the (meth)acrylate oligomer is preferably 20,000 or less, more preferably 18,000 or less, and even more preferably 16,000 or less, in terms of the dispensability of the adhesive.

Other than acrylate oligomers, the (meth)acrylate group-containing resin may be an acrylic polymer obtained by copolymerizing an acrylate monomer with another monomer, or may be one that can be obtained by reacting (meth)acrylic acid with a resin.

Examples of the (meth)acrylate group-containing resin include partially (meth)acrylated epoxy resins. Examples of partially (meth)acrylated epoxy resins include those that can be obtained by reacting (meth)acrylic acid with epoxy resins. Such a reaction can be carried out in the presence of a basic catalyst according to a conventional method. Partially (meth)acrylated epoxy resins contain an epoxy group and a (meth)acrylate group per molecule, and thus can be cured with various curing systems. The resin composition of the present invention preferably contains a partially (meth) acrylated epoxy resin, because it can be cured efficiently, has sufficient adhesion strength after heating, and can suppress the decrease in strength after high temperature and high humidity.

The epoxy resin that can be used as a raw material in the production of the partially (meth)acrylated epoxy resin is not particularly limited. Examples include bisphenol A type epoxy resin, bisphenol F type epoxy resin, bisphenol S type epoxy resin, 2,2'-diallyl bisphenol A type epoxy resin, hydrogenated bisphenol type epoxy resin, propylene oxide-added bisphenol A type epoxy resin, resorcinol type epoxy resin, biphenyl type epoxy resin, sulfide type epoxy resin, diphenyl ether type epoxy resin, dicyclopentadiene type epoxy resin, naphthalene type epoxy resin, phenol novolac type epoxy resin, orthocresol novolac type epoxy resin, dicyclopentadiene novolac type epoxy resin, biphenyl novolac type epoxy resin, naphthalene phenol novolac type epoxy resin, glycidyl amine type epoxy resin, alkyl polyol type epoxy resin, rubber-modified epoxy resin, glycidyl ester compound, bisphenol A type episulfide resin, and the like.

Example of commercially available partially (meth)acrylated epoxy resins include EA-1010LC, EA-1020, EA-5323, EA-5520, EA-CHD, and EMA-1020 (all produced by Shin-Nakamura Chemical Co., Ltd.), Ebecryl 860, Ebecryl 3200, Ebecryl 3201, Ebecryl 3412, Ebecryl 3600, Ebecryl 3700, Ebecryl 3701, Ebecryl 3702, Ebecryl 3703, Ebecryl 3800, Ebecryl 6040, and Ebecryl RDX63182 (all produced by Daicel Cytec Co., Ltd.), Epoxy Ester M-600A, Epoxy Ester 40EM, Epoxy Ester 70PA, Epoxy Ester 200PA, Epoxy Ester 80MFA, Epoxy Ester 3002M, Epoxy Ester 3002A, Epoxy Ester 1600A, Epoxy Ester 3000M, Epoxy Ester 3000A, Epoxy Ester 200EA, and Epoxy Ester 400EA (all produced by Kyoeisha Chemical Co., Ltd.), Denacol Acrylate DA-141, Denacol Acrylate DA-314, and Denacol Acrylate DA-911 (all produced by Nagase ChemteX Corporation), and the like.

The partially (meth)acrylated epoxy resin is preferably a bisphenol A type partially (meth)acrylated epoxy resin.

The weight average molecular weight Mw of the partially (meth)acrylated epoxy resin is not particularly limited, but is preferably 300 to 1000, and more preferably 400 to 800.

The resin composition of the present invention may contain only one, or two or more of the (meth)acrylate group-containing resins.

The resin composition of the present invention preferably contains the (meth)acrylate group-containing resin(s) (a) in a total amount of 30 wt % or more based on the entire composition. As a result, the resin composition of the present invention has more excellent thermal durability after curing. In this respect, the resin composition of the present invention more preferably contains an acrylate monomer and the (meth)acrylate group-containing resin (a) in a total amount of 35 wt % or more based on the entire composition.

The resin composition of the present invention preferably contains the (meth)acrylate group-containing resin (a) in a total amount of 80 wt. % or less, and more preferably 60 wt % or less, based on the entire composition.

(b) Polyfunctional Thiol

The resin composition contains at least one polyfunctional thiol selected from the group consisting of compounds represented by the following formulas (1) and (1)

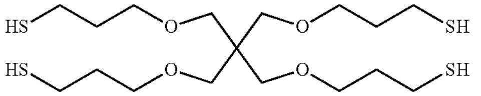

(2)

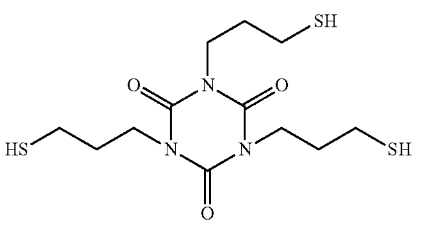

"Multhiol Y-4" (SC Organic Chemical Co., Ltd.) can be used as the compound represented by formula (1).

"Multhiol K-3" (SC Organic Chemical Co., Ltd.) can be used as the compound represented by formula (2).

The resin composition of the present invention has excellent moisture resistance after curing, because it contains at least one of the polyfunctional thiols (b) having a specific structure. One of the reasons therefor is that the polyfunctional thiols (b) do not have an ester bond. Many polyfunctional thiols are known to have an ester bond; however, ester bonds are easily hydrolyzed. Therefore, the resin composition of the present invention, which contains at least one of the polyfunctional thiols (b) having a specific structure as a polyfunctional thiol, is superior in moisture resistance after curing to a resin composition containing a polyfunctional thiol having an ester bond.

Further, the resin composition of the present invention has excellent position accuracy after curing, because it contains at least one of the polyfunctional thiols (b) having a specific structure. This is considered to be because the polyfunctional thiols (b) do not contain a hydroxyl group and are less likely to absorb water under high temperature and high humidity after curing. In addition, the resin composition of the present invention has excellent adhesion at the interface with a surface to be bonded, such as LCP, because it contains at least one of the polyfunctional thiols (b) having a specific structure. This is considered to be because the polyfunctional thiols (b) do not contain a hydroxyl group and are less likely to draw water. Further, the resin composition of the present invention has excellent durability after high temperature and high humidity, because it contains at least one of the polyfunctional thiols (b) having a specific structure. This is considered to be because the polyfunctional thiols (b) have a flexible skeleton and thus react efficiently during heat-curing to improve the crosslink density.

The resin composition of the present invention generally contains at least one of the polyfunctional thiols (b) in a total amount of 5 to 50 wt % based on the entire composition. The resin composition of the present invention preferably contains at least one of the polyfunctional thiols (b) in a total amount of 10 wt % or more based on the entire composition.

(c) Latent Curing Agent

As the latent curing agent (c), those generally used in the technical field of UV-curing or thermosetting adhesives can be used. Examples of the latent curing agent (c) include polyamine, imidazole, and the like.

Specific examples of polyamine as the latent curing agent (c) include AJICURE (amine adduct type) PN23J, PN31J, and PN40J (Ajinomoto Fine-Techno Co., Inc.), Fujicure FXR-1020, FXR-1030, FXR-1050, and FXR-1080 (produced by Fuji Kasei Co., Ltd.), Adeka Hardener EH-43575 and EH-5030S (produced by ADEKA), EH-5057 (produced by ADEKA), EH-5057PK (produced by ADEKA), and the like.

The resin composition of the present invention may contain only one, or two or more of the latent curing agents (c).

In terms of excellent adhesion and sufficient addition reaction with an acrylic monomer and oligomer, the resin composition of the present invention preferably contains the latent curing agent (c) in an amount of 5 wt % or more, more preferably 10 wt % or more, based on the entire composition. In terms of excellent moisture resistance and dispensability, the resin composition of the present invention preferably contains the latent curing agent (c) in an amount of 40 wt % or less, and more preferably 30 wt % or less, based on the entire composition.

(d) Polymerization Inhibitor

The resin composition of the present invention contains at least one polymerization inhibitor (d) selected from the group consisting of N-nitrosophenylhydroxylamine aluminum, triphenyl phosphite, p-methoxyphenol, and hindered phenol, for the purpose of suppressing radical polymerization.

The resin composition of the present invention preferably contains the polymerization inhibitor (d) in an amount of 0.01 to 5 wt % based on the entire composition, in terms of suppressing radical polymerization.

(e) Anionic Polymerization Inhibitor that is an Organic Acid

The resin composition of the present invention contains an anionic polymerization inhibitor (e) that is an organic acid for the purpose of suppressing anionic polymerization. Specific examples of the anionic polymerization inhibitor (e) that is an organic acid include barbituric acid.

The resin composition of the present invention preferably contains the polymerization inhibitor (e) in an amount of 0.1 to 5 wt % based on the entire composition, in terms of suppressing anionic polymerization.

(f) Photopolymerization Initiator

The photopolymerization initiator (f) is not particularly limited, and those generally used in the technical field of UV-curing can be used.

Specific examples of the photopolymerization initiator include Omnirad 651 (2,2-dimethoxy-1,2-diphenylethan-1-one), Omnirad 184 (1-hydroxy-cyclohexyl-phenyl-ketone), Omnirad 1173 (2-hydroxy-2-methyl-1-phenyl-propan-1-one), Omnirad 2959 (1-[4-(2-hydroxyethoxy)-phenyl]-2-hydroxy-2-methyl-1-propan-1-one), Omnirad 127 (2-hydroxy-1-{4-[4-(2-hydroxy-2-methyl-propionyl)-benzyl]phenyl}-2-methyl-propan-1-one), Omnirad 907 (2-methyl-1-(4-methylthiophenyl)-2-morpholinopropan-1-one), Omnirad 369 (2-benzyl-2-dimethylamino-1-(4-morpholinophenyl)-butanone-1), Omnirad 379 (2-(dimethylamino)-2-[(4-methylphenyl)methyl]-1-[4-(4-morpholinyl)phenyl]-1-butanone), Omnirad TPO (2,4,6-trimethylbenzoyl-diphenyl-phosphine oxide), Omnirad 819 (bis(2,4,6-trimethylbenzoyl)-phenylphosphine oxide), Omnirad 784 (bis(n5-2,4-cyclopentadien-1-yl)-bis(2,6-difluoro-3-(1H-pyrrol-1-yl)-phenyl)titanium), Omnirad OXE 01 (1,2-Octanedione, 1-[4-(phenylthio) phenyl]-, 2-(o-benzoyloxime)), Omnirad OXE 02 (ethanone, 1-[9-ethyl-6-(2-methylbenzoyl)-9H-carbazol-3-yl]-, 1-(O-acetyloxime)), Omnirad 754 (blend of oxy-phenyl-acetic acid 2-[2-oxo-2-phenylacetoxy-ethoxy]ethyl ester and oxy-phenyl-acetic acid 2-(2-hydroxy-ethoxy)ethyl ester), Omnirad TPO, LR8893, and LR8970 (all produced by IGM Resins B.V.), DETX-S (2,4-diethylthioxanthone) (produced by Nippon Kayaku Co., Ltd.), Ubecryl P36 (produced by UCB), and the like.

The photopolymerization initiators may be used singly or in combination of two or more.

The resin composition of the present invention preferably contains the photopolymerization initiator (f) in an amount of 0.1 wt % or more, and more preferably 0.5 wt % or more, based on the entire composition, in terms of excellent UV curability. In terms of the stability of adhesiveness, the resin composition of the present invention preferably contains the photopolymerization initiator (f) in an amount of 5 wt % or less, and more preferably 2 wt % or less, based on the entire composition.

(g) Epoxidized Polybutadiene

The resin composition of the present invention may further contain epoxidized polybutadiene (g).

The epoxidized polybutadiene (g) is preferably epoxidized 1,2-polybutadiene.

The resin composition of the present invention preferably contains the epoxidized polybutadiene (g) in an amount of 5 to 20 wt % based on the entire composition, in terms of obtaining excellent compatibility.

(h) Other Components

The resin composition of the present invention may further contain other components. Examples of other components include general rheology modifiers, adhesion-imparting agents, fillers, and the like.

Physical Properties

The resin composition of the present invention preferably has an adhesion strength of 7 MPa or more after being cured with heat and UV. Further, the resin composition of the present invention preferably has an adhesion strength reduction rate of 40% or less after a reliability test (85° C./85% RH, 250 hours).

Use

The resin composition of the present invention is preferably used for assembling a camera module and/or sensing module. The sensing module is an optical sensor for reading laser light, and it includes, for example, LiDAR (light detection and ranging) and the like. More specifically, the resin composition of the present invention is preferably used in camera module assembly to bond a lens holder and a substrate on which an imaging element is fixed. In the above, the camera module is not particularly limited, and examples include small camera modules used for smartphones and the like. The resin composition of the present invention is also preferably used in a sensing module assembly to bond constituent members of this module, such as at least two members selected from the group consisting of liquid crystal polymer, polycarbonate, polyamide, polybutylene terephthalate, cycloolefin polymer, ceramics, SUS, aluminum, and nickel.

Examples

The present invention is described below with reference to Examples; however, the present invention is not limited to these Examples and the like. The value of each component in the tables indicates weight (g), unless otherwise specified.

Adhesive compositions of Examples 1 to 12 and Comparative Examples 1 to 4 were each prepared by mixing components at the composition ratios shown in Tables 2-2b. Specifically, each component was well dispersed using a 3-roll mill, and the resulting mixture, other additives, etc., were mixed using a planetary mixer, followed by vacuum defoaming, thereby obtaining adhesive compositions.

"Multhiol Y-4" (SC Organic Chemical Co., Ltd.), "Multhiol K-3" (SC Organic Chemical Co., Ltd.), "Multhiol Y-3" (SC Organic Chemical Co., Ltd.), and "C3TS-G" (Shikoku Chemicals Corporation) used as polyfunctional thiols are compounds represented by the following formulas (1) to (4), respectively.

TABLE 1

| | | |
|---|---|---|
| Multhiol Y-4 | 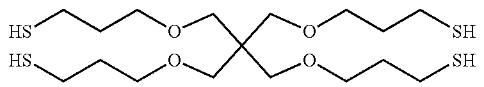 [SMILES: SCCCOCC(COCCCS)(COCCCS)COCCCS] | (1) |
| Multhiol K-3 | 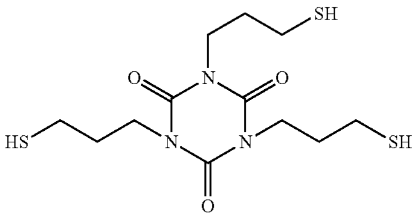 [SMILES: O=c1n(CCCS)c(=O)n(CCCS)c(=O)n1CCCS] | (2) |

TABLE 1-continued

| | | |
|---|---|---|
| Multhiol Y-3 | 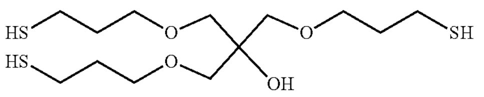 [SMILES: OC(COCCCS)(COCCCS)COCCCS] | (3) |
| C3TS-G | 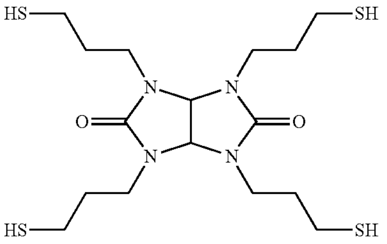 [SMILES: O=C1N(CCCS)C2C(N1CCCS)N(CCCS)C(=O)N2CCCS] | (4) |

The physical properties were each evaluated as follows. Tables 2-2b show the evaluation results.

Adhesion Strength Test

The adhesion strength test was performed as shown in FIG. 1. The details are as described below. The adhesive composition was dispensed on a 15 mm×15 mm ceramic substrate in a square shape of 5 mm×5 mm so that the weight was about 3.5 mg. Then, a PC chip with a shape of 7 mm×7 mm was mounted, and the thickness of the adhesive was adjusted to 100 μm. A 365 nm-LED was irradiated from four surrounding directions at 500 mW/$cm^2$ for 4 seconds for temporary curing. Then, the sample was heat-cured in a hot-air circulation oven at 80° C. for 60 minutes, and measured using a Dage 4000 Universal Bond Tester at a shear speed of 200 μm/s and a shear height of 120 μm.

The conditions for a reliability test were 85° C./85% RH and 250 hours.

Tables 2-2b show the evaluation results. It is demonstrated that the resin compositions of Examples 1 to 12 have excellent adhesion strength at the initial stage of heat-curing, and show a low rate of decrease in the adhesion strength after the reliability test, because they contain a thiol compound with a specific structure, and the ratio of component (a) to the entire composition is 30 wt % or more.

On the other hand, it is demonstrated that the resin compositions of Comparative Examples 1 and 2 show a high rate of decrease in the adhesion strength after the reliability test, because they contain thiol compounds that are different from the thiol compounds with a specific structure of the present invention.

Further, it is demonstrated that the resin composition of Comparative Example 3 has inferior position accuracy after a high-temperature and high-humidity durability test after curing, because it contains a thiol compound having a hydroxyl group, so that the resin composition tends to absorb water during the high-temperature and high-humidity durability test.

In addition, it is demonstrated that the resin composition of Comparative Example 4 has inferior durability after high temperature and high humidity, because it contains a thiol compound having poor mobility, so that it tends to lead to insufficient crosslinking, and thereby allowing water to intrude into the resin composition as well as the interface between the resin composition and the coated surface.

TABLE 2

| Type | Compound name "product name" (manufacturer) | Example 1 | Example 2 | Example 3 | Example 4 | Example 5 | Example 6 |
|---|---|---|---|---|---|---|---|
| (a) Acrylate monomer and (meth)acrylate group-containing resin | Tricyclodecanedimethanol diacrylate "SR833" (Sartomer) | 46 | 43 | 64 | | 39 | 35 |
| | Isobornyl acrylate "IBXA" (Osaka Organic Chemical Industry Ltd.) | | | | | | |
| | Polycarbonate-based urethane acrylate oligomer "UV3310B" (Mitsubishi Chemical Corporation) | | | | | | |
| | Bisphenol A type partially (meth)acrylated epoxy resin "EA-1010LC" (Shin-Nakamura Chemical Co., Ltd.) | | | | 61 | 10 | 10 |
| (b) Polyfunctional thiol | "Multhiol Y-4" (SC Organic Chemical Co., Ltd.) | 34 | | | | 31 | |
| | "Multhiol K-3" (SC Organic Chemical Co., Ltd.) | | 37 | 16 | 19 | | 35 |

TABLE 2-continued

| Type | Compound name "product name" (manufacturer) | Example 1 | Example 2 | Example 3 | Example 4 | Example 5 | Example 6 |
|---|---|---|---|---|---|---|---|
| (b') Polyfunctional thiol | Pentaerythritol tetrakis(3-mercaptopropionate) "PEMP" (SC Organic Chemical Co., Ltd.) | | | | | | |
| | 1,3,5-Tris-(2-(3-sulfanylbutanoyloxy)ethyl)-1,3,5-triazinane-2,4,6-trione "NR" (Karenz) | | | | | | |
| | "Multhiol Y-3" (SC Organic Chemical Co., Ltd.) | | | | | | |
| | "C3TS-G" (Shikoku Chemicals Corporation) | | | | | | |
| (c) Latent curing agent | "AJICURE 23J" (Ajinomoto Fine-Techno Co., Inc.) | 15 | 15 | 15 | 15 | 15 | 15 |
| | "5057P" (Adeka) | | | | | | |
| (d) Polymerization inhibitor | Triphenyl phosphite | 1 | 1 | 1 | 1 | 1 | 1 |
| | Pentaerythritol tetrakis(3-(3,5-di-tert-butyl-4-hydroxyphenyl)propionate "Irganox 1010" (BASF) | 1 | 1 | 1 | 1 | 1 | 1 |
| (e) Anionic polymerization inhibitor | Barbituric acid | 3 | 3 | 3 | 3 | 3 | 3 |
| (f) Photopolymerization initiator | 1-Hydroxycyclohexyl-phenyl ketone "Omnirad 184" (IGM Resins B.V.) | 2 | 2 | 2 | 2 | 2 | 2 |
| (g) Epoxidized polybutadiene | Epoxidized 1,2-polybutadiene "BF-1000" (Adeka) | | | | | | |
| ilane coupling agent | 3-Glycidoxypropyltrimethoxysilane "KBM-403" (Shin-Etsu Chemical Co., Ltd.) | 0.5 | 0.5 | 0.5 | 0.5 | 0.5 | 0.5 |
| Rheology modifier | NK200 (Nippon Aerosil Co., Ltd.) | 5 | 5 | 5 | 5 | 5 | 5 |
| Total | | 107.5 | 107.5 | 107.5 | 107.5 | 107.5 | 107.5 |
| Adhesion strength to LCP after curing (MPa) | | 10 | 14 | 11 | 9 | 11 | 14 |
| Decrease in adhesion strength after the reliability test (%) | | 25 | 20 | 27 | 23 | 20 | 15 |

TABLE 2a

| Type | Compound name "product name" (manufacturer) | Example 7 | Example 8 | Example 9 | Example 10 | Example 11 | Example 12 |
|---|---|---|---|---|---|---|---|
| (a) Acrylate monomer and (meth)acrylate group-containing resin | Tricyclodecanedimethanol diacrylate "SR833" (Sartomer) | 20 | 20 | 15 | | | |
| | Isobornyl acrylate "IBXA" (Osaka Organic Chemical Industry Ltd.) | 15 | 15 | 15 | 15 | 15 | 15 |
| | Polycarbonate-based urethane acrylate oligomer "UV3310B" (Mitsubishi Chemical Corporation) | 20 | 20 | 20 | 20 | 20 | 20 |
| | Bisphenol A type partially (meth)acrylated epoxy resin "EA-1010LC" (Shin-Nakamura Chemical Co., Ltd.) | | | | 20 | 20 | 10 |
| (b) Polyfunctional thiol | "Multhiol Y-4" (SC Organic Chemical Co., Ltd.) | 15 | | | 15 | | |
| | "Multhiol K-3" (SC Organic Chemical Co., Ltd.) | | 15 | 15 | | 15 | 15 |
| (b') Polyfunctional thiol | Pentaerythritol tetrakis(3-mercaptopropionate) "PEMP" (SC Organic Chemical Co., Ltd.) | | | | | | |
| | 1,3,5-Tris-(2-(3-sulfanylbutanoyloxy)ethyl)-1,3,5-triazinane-2,4,6-trione "NR" (Karenz) | | | | | | |
| | "Multhiol Y-3" (SC Organic Chemical Co., Ltd.) | | | | | | |
| | "C3TS-G" (Shikoku Chemicals Corporation) | | | | | | |

TABLE 2a-continued

| Type | Compound name "product name" (manufacturer) | Example 7 | Example 8 | Example 9 | Example 10 | Example 11 | Example 12 |
|---|---|---|---|---|---|---|---|
| (c) Latent curing agent | "AJICURE 23J" (Ajinomoto Fine-Techno Co., Inc.) | | | | | | |
| | "5057P" (Adeka) | 25 | 25 | 25 | 25 | 25 | 25 |
| (d) Polymerization inhibitor | Triphenyl phosphite | 1 | 1 | 1 | 1 | 1 | 1 |
| | Pentaerythritol tetrakis(3-(3,5-di-tert-butyl-4-hydroxyphenyl)propionate "Irganox 1010" (BASF) | 1 | 1 | 1 | 1 | 1 | 1 |
| (e) Anionic polymerization inhibitor | Barbituric acid | 3 | 3 | 3 | 3 | 3 | 3 |
| (f) Photopolymerization initiator | 1-Hydroxycyclohexyl-phenyl ketone "Omnirad 184" (IGM Resins B.V.) | 2 | 2 | 2 | 2 | 2 | 2 |
| (g) Epoxidized polybutadiene | Epoxidized 1,2-polybutadiene "BF-1000" (Adeka) | | | 10 | | | 10 |
| ilane coupling agent | 3-Glycidoxypropyltrimethoxysilane "KBM-403" (Shin-Etsu Chemical Co., Ltd.) | 0.5 | 0.5 | 0.5 | 0.5 | 0.5 | 0.5 |
| Rheology modifier | NK200 (Nippon Aerosil Co., Ltd.) | 5 | 5 | 5 | 5 | 5 | 5 |
| | Total | 107.5 | 107.5 | 107.5 | 107.5 | 107.5 | 107.5 |
| Adhesion strength to LCP after curing (MPa) | | 8 | 10 | 13 | 9 | 10 | 13 |
| Decrease in adhesion strength after the reliability test (%) | | 5 | 7 | 10 | 10 | 10 | 7 |

TABLE 2b

| Type | Compound name "product name" (manufacturer) | Comparative Example 1 | Comparative Example 2 | Comparative Example 3 | Comparative Example 4 |
|---|---|---|---|---|---|
| (a) Acrylate monomer and (meth)acrylate group-containing resin | Tricyclodecanedimethanol diacrylate "SR833" (Sartomer) | 45 | 37 | 42 | 47 |
| | Isobornyl acrylate "IBXA" (Osaka Organic Chemical Industry Ltd.) | | | | |
| | Polycarbonate-based urethane acrylate oligomer "UV3310B" (Mitsubishi Chemical Corporation) | | | | |
| | Bisphenol A type partially (meth)acrylated epoxy resin "EA-1010LC" (Shin-Nakamura Chemical Co., Ltd.) | | | | |
| (b) Polyfunctional thiol | "Multhiol Y-4" (SC Organic Chemical Co., Ltd.) | | | | |
| | "Multhiol K-3" (SC Organic Chemical Co., Ltd.) | | | | |
| (b') Polyfunctional thiol | Pentaerythritol tetrakis(3-mercaptopropionate) "PEMP" (SC Organic Chemical Co., Ltd.) | 35 | | | |
| | 1,3,5-Tris-(2-(3-sulfanylbutanoyloxy)ethyl)-1,3,5-triazinane-2,4,6-trione "NR" (Karenz) | | 43 | | |
| | "Multhiol Y-3" (SC Organic Chemical Co., Ltd.) | | | 38 | |
| | "C3TS-G" (Shikoku Chemicals Corporation) | | | | 33 |
| (c) Latent curing agent | "AJICURE 23J" (Ajinomoto Fine-Techno Co., Inc.) | 15 | 15 | 15 | 15 |
| | "5057P" (Adeka) | | | | |
| (d) Polymerization inhibitor | Triphenyl phosphite | 1 | 1 | 1 | 1 |
| | Pentaerythritol tetrakis(3-(3,5-di-tert-butyl-4-hydroxyphenyl)propionate "Irganox 1010" (BASF) | 1 | 1 | 1 | 1 |
| (e) Anionic polymerization inhibitor | Barbituric acid | 3 | 3 | 3 | 3 |
| (f) Photopolymerization initiator | 1-Hydroxycyclohexyl-phenyl ketone "Omnirad 184" (IGM Resins B.V.) | 2 | 2 | 2 | 2 |
| (g) Epoxidized polybutadiene | Epoxidized 1,2-polybutadiene "BF-1000" (Adeka) | | | | |

TABLE 2b-continued

| Type | Compound name “product name” (manufacturer) | Comparative Example 1 | Comparative Example 2 | Comparative Example 3 | Comparative Example 4 |
|---|---|---|---|---|---|
| ilane coupling agent | 3-Glycidoxy-propyltrimethoxysilane “KBM-403” (Shin-Etsu Chemical Co., Ltd.) | 0.5 | 0.5 | 0.5 | 0.5 |
| Rheology modifier | NK200 (Nippon Aerosil Co., Ltd.) | 5 | 5 | 5 | 5 |
| Total | | 107.5 | 107.5 | 107.5 | 107.5 |
| Adhesion strength to LCP after curing (MPa) | | 11 | 14 | 8 | 14 |
| Decrease in adhesion strength after the reliability test (%) | | 70 | 60 | 35 | 30 |

What is claimed is:

1. A camera module assembly, comprising:

a substrate on which an imaging element is fixed;

a lens holder; and a resin composition configured to bond the substrate and the lens holder, the resin composition comprising:

(a) a (meth)acrylate group-containing resin, (b) a polyfunctional thiol having formula (2):

(2)

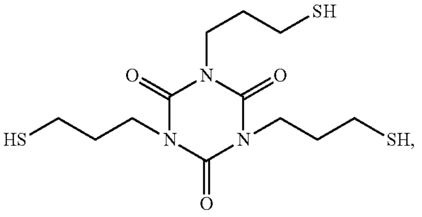

and (c) a latent curing agent.

2. The camera module assembly according to claim 1, wherein the resin composition further comprises:

(d) at least one polymerization inhibitor selected from the group consisting of N-nitrosophenylhydroxylamine aluminum, triphenyl phosphite, p-methoxyphenol, and hindered phenol.

3. The camera module assembly according to claim 1, wherein the resin composition further comprises:

(e) an anionic polymerization inhibitor that is an organic acid.

4. The camera module assembly according to claim 1, wherein the resin composition further comprises:

(f) a photopolymerization initiator.

5. The camera module assembly according to claim 1, wherein the resin composition further comprises:

(g) epoxidized polybutadiene.

6. A camera module, comprising:

a cured product obtainable by curing the resin composition of the camera module assembly according to claim 1, wherein the cured product bonds the substrate and the lens holder.

7. A camera module, comprising:

a substrate on which an imaging element is fixed;

a lens holder; and a cured product bonding the substrate and the lens holder, wherein the cured product is formed by curing a resin composition comprising:

(a) a (meth)acrylate group-containing resin, (b) a polyfunctional thiol having formula (2):

(2)

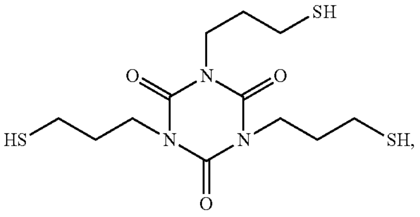

and (c) a latent curing agent.

8. A method for bonding a camera module lens holder and a camera module substrate on which an imaging element is fixed, the method comprising:

assembling the lens holder and the substrate using a resin composition;

the resin composition comprising:

(a) a (meth)acrylate group-containing resin, (b) a polyfunctional having formula (2):

(2)

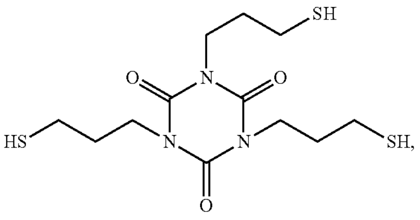

and (c) a latent curing agent; and curing the resin composition to bond the lens holder and the substrate.

* * * * *